(12) United States Patent
Simms et al.

(10) Patent No.: US 8,892,222 B2
(45) Date of Patent: Nov. 18, 2014

(54) FUME EXTRACTION SYSTEM WITH AUTOMATIC FUME HOOD POSITIONING

(75) Inventors: Marvin Simms, Montreal (CA); Jared Simms, Toronto (CA); Mark Van Vliet, Montreal (CA); Mario Santoianni, Laval (CA)

(73) Assignee: Diversitech Equipment and Sales (1984) Ltd., Montreal, Quebec (CA)

( * ) Notice: Subject to any disclaimer, the term of this patent is extended or adjusted under 35 U.S.C. 154(b) by 44 days.

(21) Appl. No.: 13/383,767

(22) PCT Filed: Jul. 16, 2010

(86) PCT No.: PCT/CA2010/001095
§ 371 (c)(1),
(2), (4) Date: Jan. 12, 2012

(87) PCT Pub. No.: WO2011/006245
PCT Pub. Date: Jan. 20, 2011

(65) Prior Publication Data
US 2012/0111845 A1    May 10, 2012

Related U.S. Application Data

(60) Provisional application No. 61/226,410, filed on Jul. 17, 2009.

(51) Int. Cl.
*G05B 19/18* (2006.01)
*B08B 15/04* (2006.01)
*B08B 15/00* (2006.01)
*B23K 9/32* (2006.01)

(52) U.S. Cl.
CPC .............. *B08B 15/04* (2013.01); *B08B 15/002* (2013.01); *B23K 9/325* (2013.01)

USPC .......................................... 700/62; 219/137 R (58) Field of Classification Search
CPC ..... B25J 9/1697; B25J 9/1694; Y10S 901/09; Y10S 901/46; Y10S 901/47
USPC ........... 219/137 R; 118/64–67; 432/150, 176, 432/196; 700/61, 170, 258, 259, 62, 166
See application file for complete search history.

(56) References Cited

U.S. PATENT DOCUMENTS 1,000,000 A * 8/1911 Holton ........................... 152/315
2,994,763 A * 8/1961 Schultz ......................... 219/123

(Continued)

FOREIGN PATENT DOCUMENTS

GB    1546067 A    5/1979
JP    58154462 A    9/1983

(Continued)

*Primary Examiner* — Henry Yuen
*Assistant Examiner* — Eric Stapleton
(74) *Attorney, Agent, or Firm* — Ipaxio S.E.N.C.

(57) ABSTRACT

The fume extraction system (10) includes a fume hood (12) located at the end of an articulated exhaust duct robotic arm (14) Three pairs of photoelectric sensors (34, 36, 38, 40, 42 and 44) are provided on the fume hood (12) to sense the presence of an electric welding arc (64) The system (10) includes a control unit (50) that generates command signals for the arm (14) based on signals received from the sensors so as to automatically position the hood (12) over the arc (64) and maintain a predetermined height distance between them A method of automatically positioning a fume hood is also disclosed The system and the method can provide a more dependable operation than ever before without the need of a complex construction.

8 Claims, 9 Drawing Sheets

(56) References Cited

U.S. PATENT DOCUMENTS

| | | | | |
|---|---|---|---|---|
| 3,209,121 A * | | 9/1965 | Manz | 219/137.7 |
| 3,233,076 A * | | 2/1966 | Vilkas | 219/124.03 |
| 3,303,321 A * | | 2/1967 | Harmsen et al. | 219/126 |
| 3,370,151 A * | | 2/1968 | Normando | 219/130.01 |
| 3,555,235 A * | | 1/1971 | Darrow et al. | 219/76.14 |
| 3,588,466 A * | | 6/1971 | Daggett | 219/137 R |
| 3,594,542 A * | | 7/1971 | Nobuaki et al. | 219/137 R |
| 3,602,687 A * | | 8/1971 | Pollock | 219/137.7 |
| 3,702,915 A * | | 11/1972 | Vilkas et al. | 219/137 R |
| 3,818,817 A * | | 6/1974 | Nederman | 454/65 |
| 3,819,902 A * | | 6/1974 | Sidbeck et al. | 219/124.34 |
| 3,826,894 A * | | 7/1974 | Melvin | 219/124.4 |
| 3,858,025 A * | | 12/1974 | Sidbeck et al. | 219/137 R |
| 4,058,299 A * | | 11/1977 | Lindkvist | 266/48 |
| 4,093,844 A * | | 6/1978 | Fellure et al. | 219/124.02 |
| 4,151,395 A * | | 4/1979 | Kushner et al. | 219/125.12 |
| 4,163,650 A * | | 8/1979 | Watson et al. | 96/57 |
| 4,192,986 A * | | 3/1980 | Udagawa et al. | 219/137 R |
| 4,287,405 A * | | 9/1981 | Ohmae et al. | 219/136 |
| 4,358,471 A * | | 11/1982 | Derkacs et al. | 427/9 |
| 4,359,622 A * | | 11/1982 | Dostoomian et al. | 219/110 |
| 4,379,548 A * | | 4/1983 | Boshoven | 454/65 |
| 4,399,346 A * | | 8/1983 | Kearney | 219/130.01 |
| 4,649,426 A * | | 3/1987 | Bolstad | 348/90 |
| 4,675,501 A * | | 6/1987 | Klingel | 219/121.67 |
| 4,706,553 A * | | 11/1987 | Sharp et al. | 454/61 |
| 4,724,751 A * | | 2/1988 | Jentzsch et al. | 454/64 |
| 4,797,528 A * | | 1/1989 | Moore et al. | 219/70 |
| 4,860,644 A * | | 8/1989 | Kohl et al. | 454/65 |
| 4,881,018 A * | | 11/1989 | Kato et al. | 318/9 |
| 5,015,822 A * | | 5/1991 | Mann | 219/137.41 |
| 5,036,754 A * | | 8/1991 | Simms et al. | 454/65 |
| 5,051,599 A * | | 9/1991 | Benes et al. | 250/491.1 |
| 5,079,404 A * | | 1/1992 | Zamuner | 219/137.41 |
| 5,159,737 A * | | 11/1992 | Kimura et al. | 15/314 |
| 5,211,602 A * | | 5/1993 | Holmgren | 454/63 |
| 5,336,130 A * | | 8/1994 | Ray | 454/65 |
| 5,398,978 A * | | 3/1995 | Gagnon | 285/184 |
| 5,499,946 A * | | 3/1996 | Valkering | 454/63 |
| 5,514,851 A * | | 5/1996 | Siewert et al. | 219/130.21 |
| 5,591,244 A * | | 1/1997 | Vross et al. | 55/356 |
| 5,702,493 A * | | 12/1997 | Everetts et al. | 55/356 |
| 5,738,148 A * | | 4/1998 | Coral et al. | 138/120 |
| 5,762,664 A * | | 6/1998 | Vross et al. | 55/319 |
| 5,873,919 A * | | 2/1999 | Vross et al. | 55/315.1 |
| 5,951,725 A * | | 9/1999 | Vross et al. | 55/356 |
| 6,022,389 A * | | 2/2000 | Vross et al. | 55/315.1 |
| 6,109,826 A * | | 8/2000 | Mertes | 404/95 |
| 6,290,740 B1 * | | 9/2001 | Schaefer | 55/385.2 |
| 6,322,618 B1 * | | 11/2001 | Simms et al. | 96/428 |
| 6,358,137 B1 * | | 3/2002 | Threlfall | 454/61 |
| 6,503,139 B2 * | | 1/2003 | Coral | 454/65 |
| 6,506,139 B2 * | | 1/2003 | Hirt et al. | 477/3 |
| 6,534,020 B1 * | | 3/2003 | Byrne | 422/168 |
| 6,540,603 B1 * | | 4/2003 | Koskinen | 454/58 |
| 6,548,783 B1 * | | 4/2003 | Kilovsky et al. | 219/125.1 |
| 6,617,547 B1 * | | 9/2003 | Abdurachmanov | 219/123 |
| 6,626,813 B1 * | | 9/2003 | Ratzel et al. | 493/464 |
| 6,648,748 B1 * | | 11/2003 | Ferlin | 454/67 |
| 6,709,637 B2 * | | 3/2004 | Byrne | 422/168 |
| 6,744,012 B2 * | | 6/2004 | Ueda et al. | 219/130.21 |
| 6,770,834 B1 * | | 8/2004 | Deshotel | 219/78.16 |
| 6,772,932 B1 * | | 8/2004 | Halstead | 228/45 |
| 6,994,619 B2 * | | 2/2006 | Scholten | 454/61 |
| 7,248,940 B2 * | | 7/2007 | Neumann et al. | 700/166 |
| 7,513,922 B2 * | | 4/2009 | Cheng | 55/385.1 |
| 7,677,961 B2 * | | 3/2010 | DeCastro et al. | 454/56 |
| 7,954,451 B2 * | | 6/2011 | Klein | 118/682 |
| 2002/0050061 A1 * | | 5/2002 | Komyoji et al. | 29/846 |
| 2003/0117596 A1 * | | 6/2003 | Nishi | 355/51 |
| 2003/0126962 A1 * | | 7/2003 | Bland et al. | 83/13 |
| 2006/0032692 A1 * | | 2/2006 | Ima et al. | 180/249 |
| 2007/0187378 A1 * | | 8/2007 | Karakas | 219/130.21 |
| 2008/0218713 A1 * | | 9/2008 | Shibazaki | 355/52 |
| 2009/0295258 A1 * | | 12/2009 | Caliendo et al. | 310/68 B |
| 2010/0010672 A1 * | | 1/2010 | Wang et al. | 700/259 |
| 2010/0030379 A1 * | | 2/2010 | Parlantzas et al. | 700/253 |

FOREIGN PATENT DOCUMENTS

| | | |
|---|---|---|
| JP | 60078198 | 5/1985 |
| JP | 3291170 A | 12/1991 |
| WO | WO0025948 A1 | 5/2000 |

* cited by examiner

FUME EXTRACTION SYSTEM WITH AUTOMATIC FUME HOOD POSITIONING

CROSS-REFERENCE TO RELATED APPLICATIONS

This application is a national stage filing under Section 371 of International Patent Application No. PCT/CA2010/001095 filed on 16 Jul. 2010 and published in English as WO 2011/006245 A1 on 20 Jan. 2011. PCT/CA2010/001095 claims priority to U.S. Provisional Patent Application Ser. No. 61/226,410 filed on 17 Jul. 2009. The entire contents of PCT/CA2010/001095 and U.S. Provisional Patent Application No. 61/226,410 are incorporated herein by reference in their entirety.

TECHNICAL FIELD

The technical field relates to fume extraction systems for use in workplaces such as welding shops, industrial plants, etc.

BACKGROUND

In workplaces where manufacturing processes such as welding are carried out, there may be significant quantities of fumes, gases, vapors, dusts or the like (all of which are generically referred to herein as "fumes") being produced at various locations. For instance, a work tool such as a welding gun working against a workpiece can produce fumes which need be extracted from the work area.

It is generally desirable that fumes be extracted from a point that is as close as possible from their source. This way, the proportion of fumes being captured can be maximized while the overall air quantity removed from the work area is minimized. In some manufacturing processes, the position of the fume source can change during the operation of the work tool. One example is the arc of an electric welding gun that often moves relative to the workpiece as the weld is being formed. In the case of relatively long welds, the fume hood of a fume extraction system, through which air and fumes are aspirated, may need to be repositioned to remain effective until the welds are completed.

Some fume extraction systems are provided with fume hoods that can automatically follow a fume source have been proposed over the years in an effort to fulfill that need. For instance, the arrangement disclosed in WO 00/25948, published on 11 May 2000, includes an automatic motorized arm for aspirating welding fumes and light sensors for detecting the electric welding arc. A single light sensor with a variable sensitivity is used for the up and down motion of the aspirating hood. This arrangement, however, can only work at a single arc intensity. In practice, the arc intensity not only varies while working on a same workpiece, it also varies greatly from one type of welding process to another. A second limitation of the disclosed arrangement is that it can often cause undesirable erratic motions of the aspirating hood, especially when the arc is initially off centered with reference to the aspirating hood. Hence, the arrangement was not found to be satisfactory.

Accordingly, room for improvements still exists in this area.

SUMMARY

In one aspect, there is provided a fume extraction system capable of automatically following an electric welding arc, the system being characterized in that it includes: a base; a fume hood; an articulated exhaust duct robotic arm mounted between the base and the fume hood; a first pair of photoelectric sensors provided on the fume hood to sense the presence of the electric welding arc, the photoelectric sensors of the first pair being spaced apart from one another along a first axis; a second pair of photoelectric sensors provided on the fume hood to sense the presence of the electric welding arc, the photoelectric sensors of the second pair being spaced apart from one another along a second axis; a third pair of photoelectric sensors provided on the fume hood to sense the presence of the electric welding arc, the photoelectric sensors of the third pair being spaced apart from one another along a third axis, which third axis is substantially parallel to the first axis; and a control unit that generates command signals for the articulated exhaust duct robotic arm so as to automatically position the fume hood over the electric welding arc and maintain a predetermined height distance between the fume hood and the electric welding arc, the command signals being based on signals received from the three pairs of photoelectric sensors, the control unit including: a first control subunit that generates command signals for a motion of the fume hood along a first path above the electric welding arc based on the signals received from the photoelectric sensors of the first pair; a second control subunit that generates command signals for a motion of the fume hood along a second path above the electric welding arc based on signals received from the photoelectric sensors of the second pair; and a third control subunit that generates command signals for a motion of the fume hood along a third path based on the signals received from the photoelectric sensors of the first pair and photoelectric sensors of the third pair, the motion along the third path substantially corresponding to a height distance variation between the fume hood and the electric welding arc.

In another aspect, there is provided a method of automatically positioning a fume hood above an electric welding arc during a welding operation on a workpiece, the fume hood being mounted at the free end of a robotic arm, the method being characterized in that it includes: sensing the light level received from the arc at a first and a second location under the fume hood, the first and the second location being spaced apart along a first axis; sensing the light level received from the arc at a third and a fourth location under the fume hood, the third and the fourth location being spaced apart along a second axis that is orthogonal to the first axis; sensing the light level received from the arc at a fifth and a sixth location under the fume hood, the fifth location being adjacent to the first location and the sixth location being adjacent to the second location; and generating command signals for the robotic arm based on the light levels sensed at the six locations such that the fume hood is moved to a given height distance right above the arc and automatically follows the arc as it moves over the workpiece.

Further details on these aspects as well as other aspects of the proposed concept will be apparent from the following detailed description and the appended figures.

DETAILED DESCRIPTION

Figure 1:
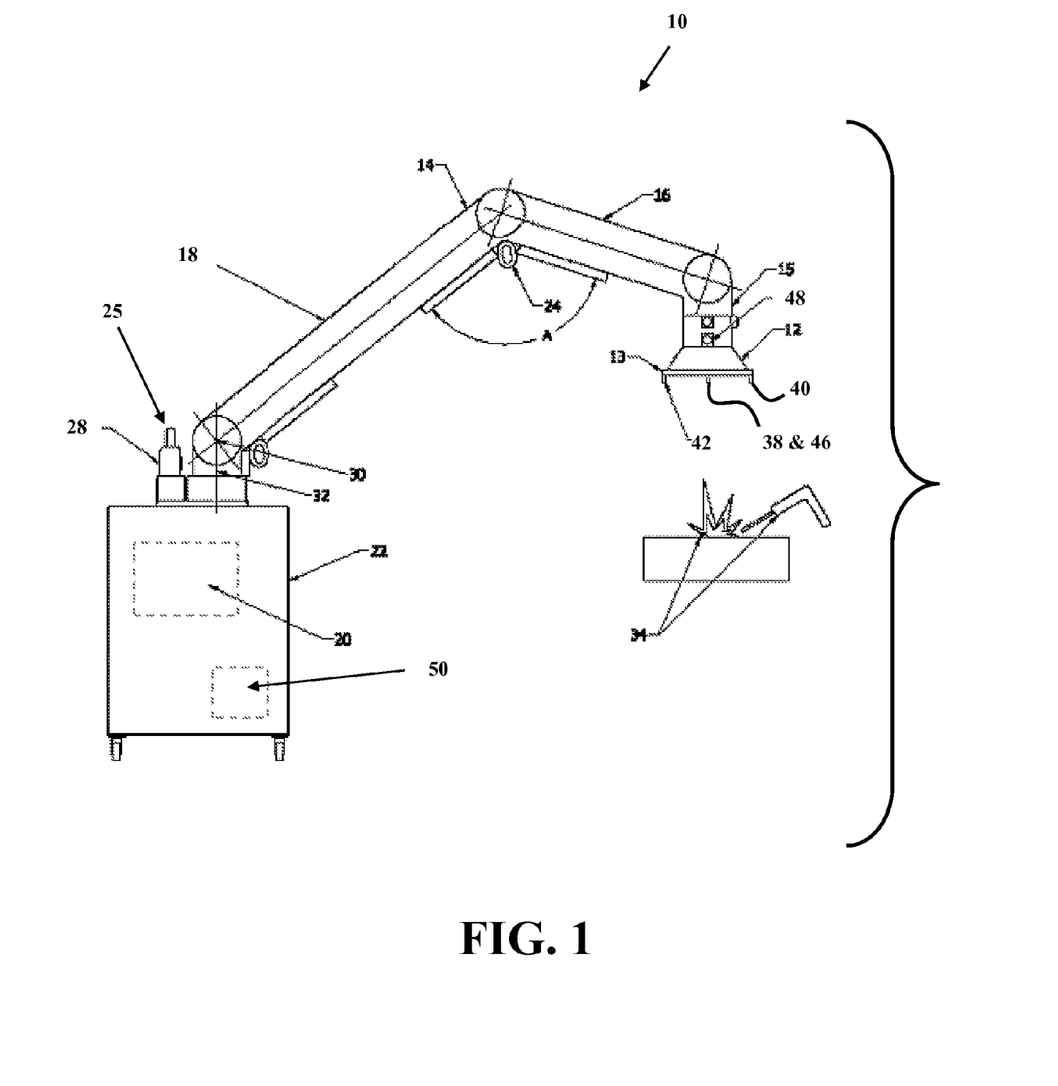
FIG. 1 is a side view illustrating an example of a fume extraction system incorporating the proposed concept.
Figure 2:
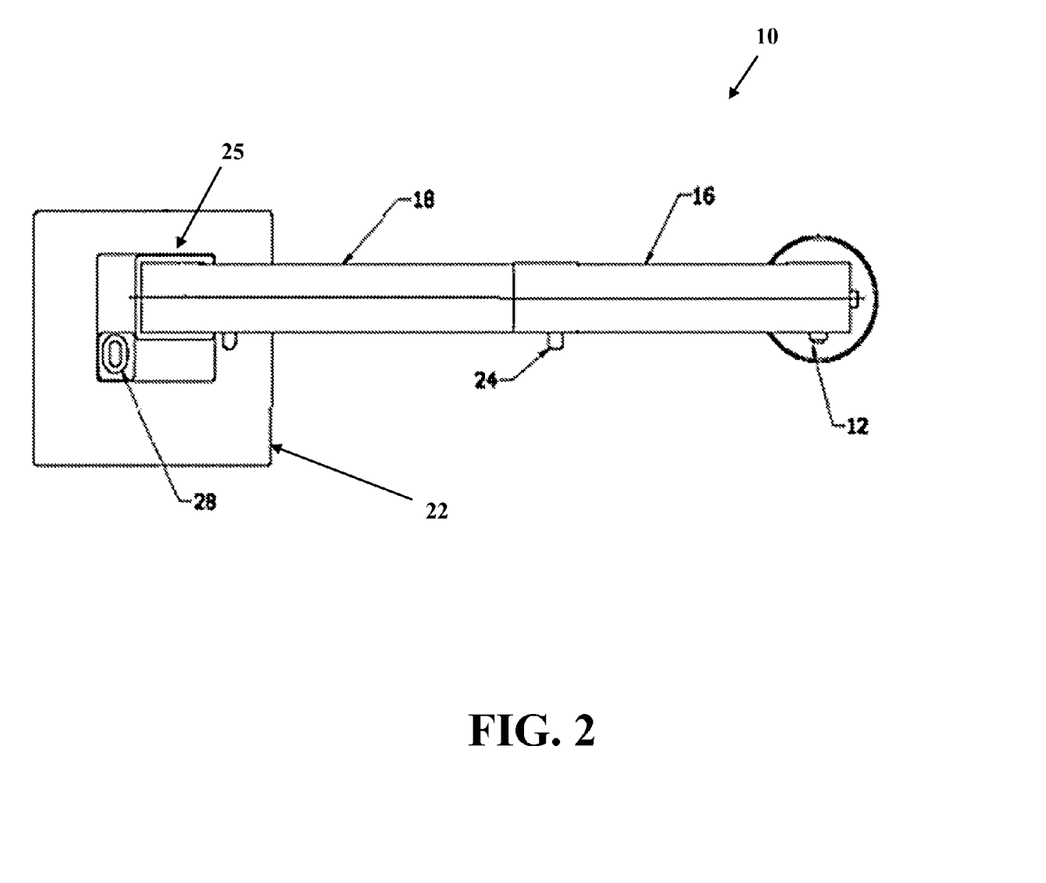
FIG. 2 is a top view of the system shown in FIG. 1.
Figure 3:
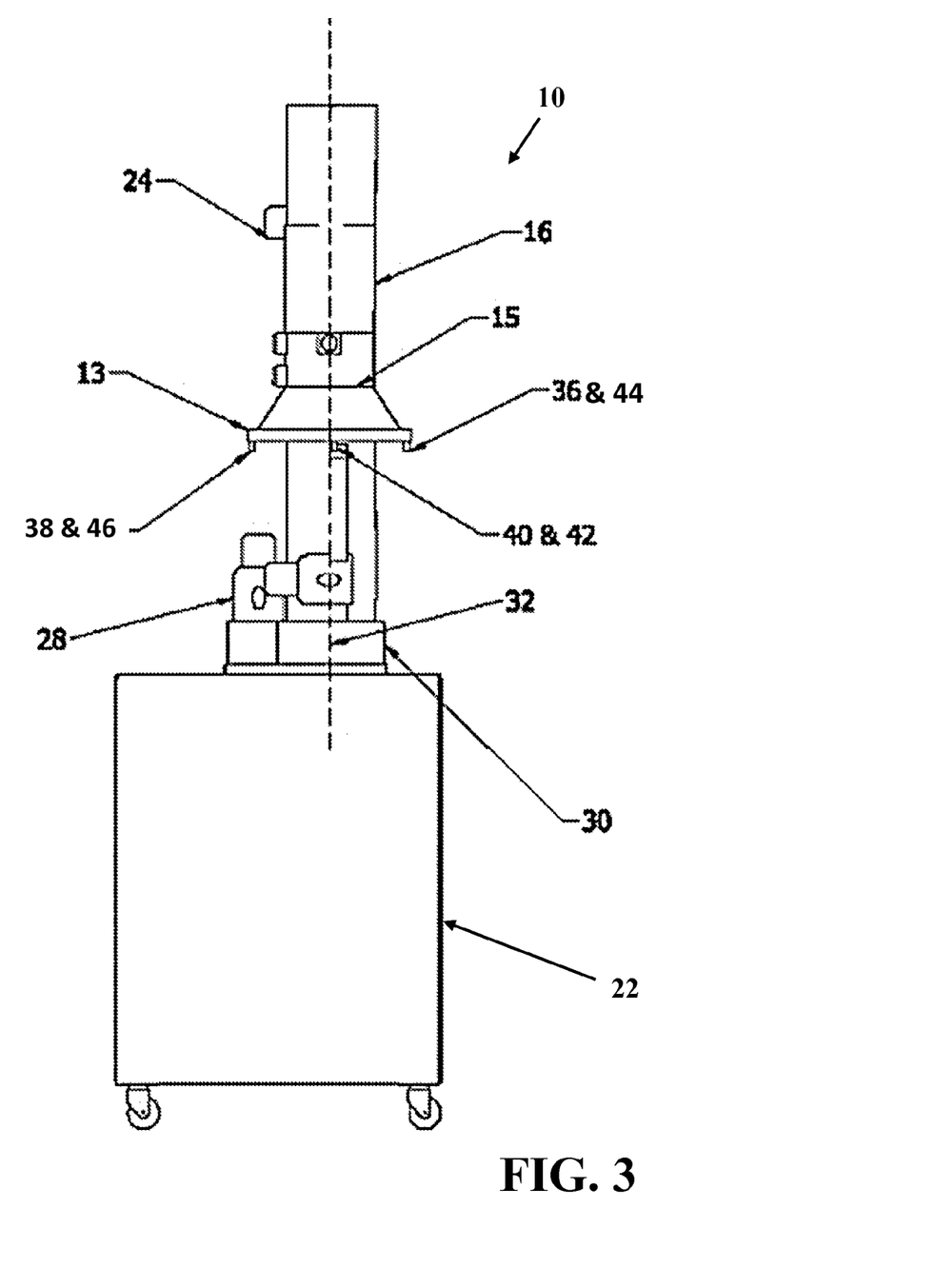
FIG. 3 is a front view of the system shown in FIG. 1.

FIGS. 1 to 3 illustrate an example of a fume extraction system 10 incorporating the proposed concept. FIG. 1 is a side view of the system 10. FIGS. 2 and 3 are respectively a top view and a front view of the system 10 shown in FIG. 1.

The system 10 includes a fume hood 12 provided at the free end of an articulated exhaust duct robotic arm 14. The fume hood 12 of the illustrated example is generally in the form of a truncated cone, having a wide mouth 13 and a narrow top 15. Other shapes and configurations are possible.

The arm 14 of the illustrated example includes two juxtaposed segments, namely a distal segment 16 and a proximal segment 18. The distal segment 16 and the proximal segment 18 can have equal or unequal lengths. Also, it is possible to design the arm 14 with more than two juxtaposed segments.

The fume hood 12 at the free end of the arm 14 is in fluid communication with a source of vacuum. In the illustrated example, the source of vacuum is a blower 20 provided within a base 22 of the system 10. The base 22 is provided on a movable cart but other configurations and arrangement are possible. Air and fumes aspirated through the fume hood 12 flow inside the segments 16, 18 of the arm 14 before reaching the base 22. The blower 20 can be powered by an electric motor or by another source of power. The air and fumes circulating through the blower 20 are conducted elsewhere in the workplace through an external air duct (not shown) for further handling or scrubbing, or for being discharge into the atmosphere. It is also possible that the air and fumes be filtered or otherwise treated within the base 22 itself. Alternatively, the vacuum source can be provided at a remote location.

One end of the proximal segment 18 is connected to the base 22. The opposite end of the proximal segment 18 is pivotally connected to a corresponding end of the distal segment 16. This pivot joint allows the distal segment 16 to be moved in a vertical plane relative to the proximal segment 18. An electric actuator joint motor 24 is provided at the joint to change the relative angle A between the two segments 16, 18. It thus permits a pitch motion of the distal segment 16 of the arm 14, thereby moving the fume hood 12 along a circular path in a vertical plane. In the illustrated example, the angle A can have a range between about 5 and 180 degrees. Other configurations, arrangements and kinds of actuators are also possible.

The illustrated system 10 further includes a pivot joint between the proximal segment 18 of the arm 14 and the base 22. An electric actuator joint motor 30 is provided to change the pitch angle of the proximal segment 18, thereby moving the fume hood 12 along a circular path in a vertical plane. The proximal segment 18 is mounted to the base 22 using a carriage 25, which carriage 25 is itself mounted on another pivot joint allowing the arm 14 to be pivoted around a vertical axis 32. An electric actuator joint motor 28 on the side of the carriage 25 is provided to rotate the carriage 25 so as to change the yaw angle of the arm 14, thereby moving the fume hood 12 along a circular path in a horizontal plane.

By combining the operations of the joint motors 24 and 30, net forward and rearward motion as well as vertical motion of the fume hood 12 can be achieved. Likewise, sideways motion is achieved by the operation of the joint motor 28. Thus, by controlling operation of all three motors 24, 28 and 30, the positioning of the fume hood 12 within a designated area around the base 22 can be accomplished, and vertical positioning can be effected.

Six photoelectric sensors 36, 38, 40, 42, 44 and 46 are provided under the fume hood 12, near the open mouth 13, to sense the presence of the electric welding arc. In the illustrated example, the sensors are located adjacent to the periphery of the open mouth 13. The photoelectric sensors 36, 38, 40, 42, 44 and 46 can be cadmium sulfide cells. A cadmium sulfide cell is a resistor whose resistance decreases with increasing incident light intensity.

Figure 4:
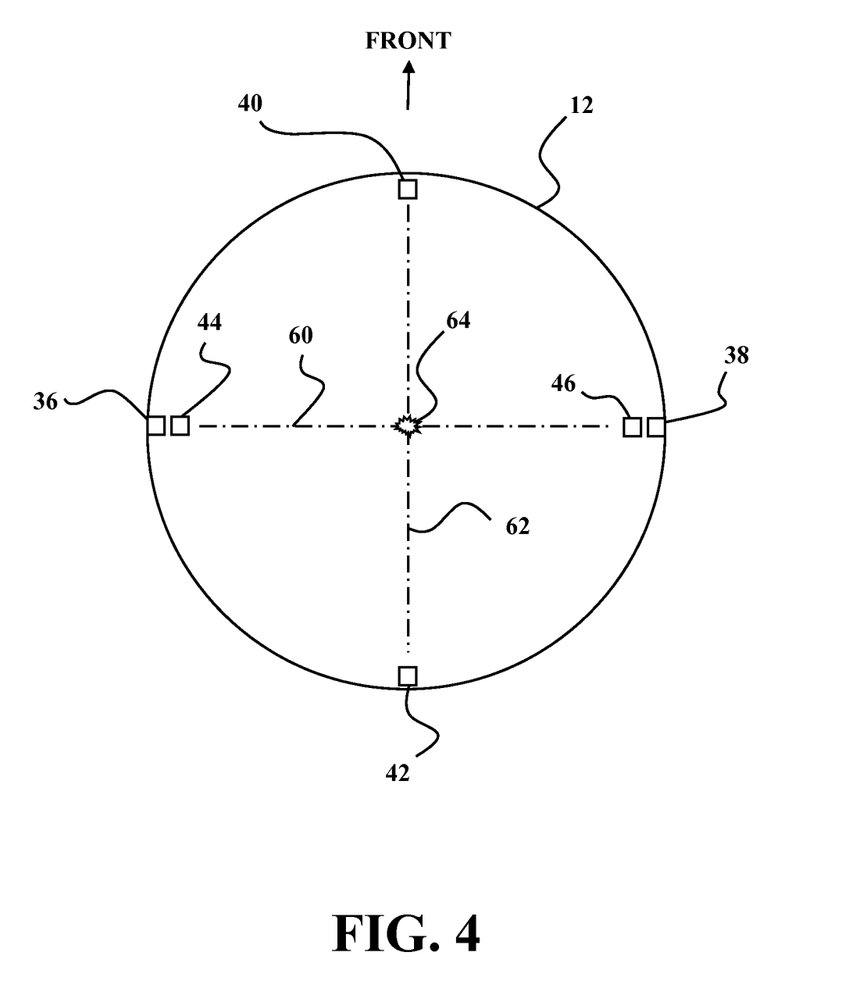
FIG. 4 is a semi-schematic top view of the fume hood illustrating an example of the relative positions of the photoelectric sensors of the system shown in FIG. 1.

FIG. 4 is a semi-schematic top view of the fume hood 12. The front side is at the top of the figure, as indicated. FIG. 4 illustrates an example of the relative positions of the various photoelectric sensors 36, 38, 40, 42, 44 and 46 of the system 10 shown in FIG. 1. The photoelectric sensors 36 and 38 form a first pair and are spaced apart from one another along a first axis 60. The photoelectric sensors 40 and 42 form a second pair and are spaced apart from one another along a second axis 62. In the illustrated example, both axes 60, 62 are orthogonal. They intersect one another substantially at the center of the fume hood 12. In use, the system 10 will seek to maintain the position of the electric welding arc, depicted at 64, approximately at the center of the fume hood 12.

The photoelectric sensors 44 and 46 form a third pair and are spaced apart from one another along a third axis that is substantially parallel to the first axis 60. In the illustrated example, this third axis is coincident with the first axis 60. The photoelectric sensor 44 is located adjacent to the photoelectric sensor 36 and the photoelectric sensor 46 is located adjacent to the photoelectric sensor 38.

Figure 5:
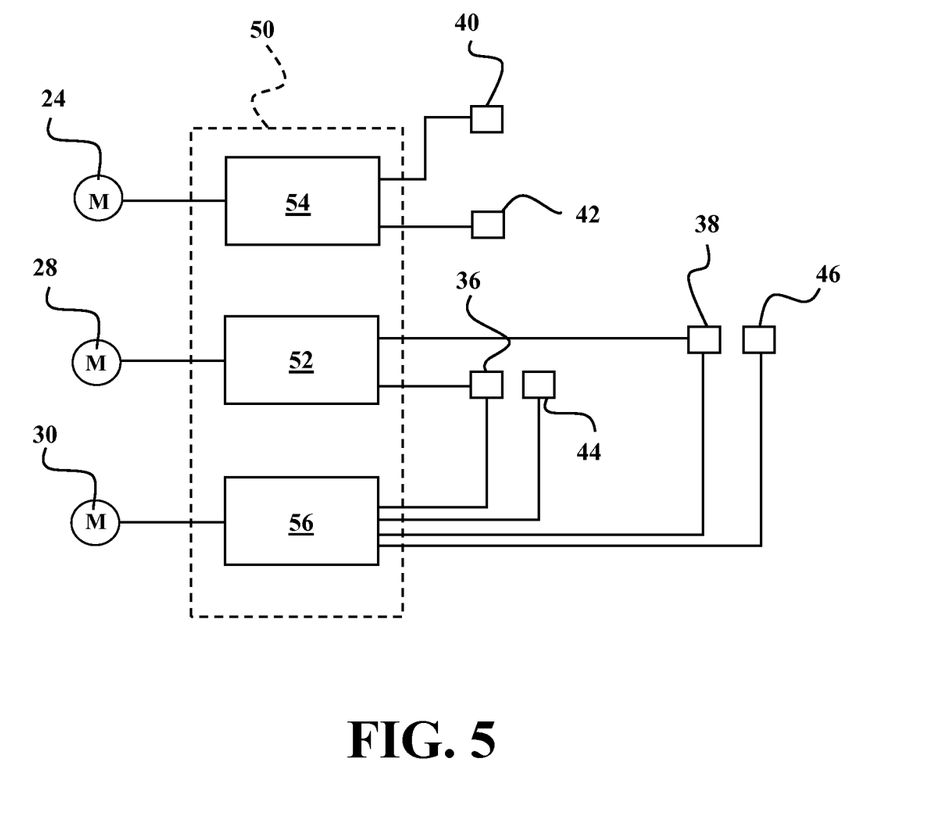
FIG. 5 is a block diagram depicting an example of the connections between the photoelectric sensors, the control unit and the joint motors of the system shown in FIG. 1.

FIG. 5 is a block diagram depicting an example of the connections between the photoelectric sensors 36, 38, 40, 42, 44 and 46, the control unit 50 and the joint motors 24, 28 and 30 of the system 10 shown in FIG. 1. It illustrates that the photoelectric sensors 36, 38, 40, 42, 44 and 46 are connected to a control unit 50. The control unit 50 generates command signals for the articulated exhaust duct robotic arm 14 so as to automatically position the fume hood 12 over the electric welding arc 64 and maintain a predetermined distance between the fume hood 12 and the electric welding arc 64 without the intervention of the operator of the work tool. The command signals are based on signals received from the three pairs of photoelectric sensors 36, 38, 40, 42, 44 and 46.

The control unit 50 of the illustrated example is located within the base 22, as schematically illustrated in FIG. 1. Other arrangements and configurations are also possible. The control unit 50 is designed to receive the signals from the various photoelectric sensors 36, 38, 40, 42, 44 and 46, process the information and determine if the fume hood 12 needs to be repositioned over the electric welding arc 64. If the fume hood 12 needs to be repositioned, the control unit 50 sends command signals to one or more of the joint motors 24, 28, and 30. Also, the control unit 50 can be designed so that no command signal is sent to the joint motors 24, 28, and 30 if no arc is detected by one or more of the photoelectric sensors 36, 38, 40, 42, 44 and 46. This arrangement permits arc sensing well outside the immediate perimeter of the fume hood 12. In the illustrated example, if an electric welding arc 64 is detected by one of the photoelectric sensors 36, 38, 40 and 42 outside the hood perimeter, a higher gain on the associated joint motor is used to bring the fume hood 12 quickly to the desired location. Once inside the immediate area under the fume hood 12, a lower gain is used for more stable operation and the remaining sensors will come into play.

As shown in FIG. 5, the control unit 50 includes a first control subunit 52 that generates command signals for a motion of the fume hood 12 along a first path above the electric welding arc 64 based on the signals received from the photoelectric sensors 36, 38 of the first pair. In the illustrated example, the first axis 60 is tangential to the first path. The motion of the fume hood 12 along the first path, however, can be considered to be substantially parallel to the first axis 60.

The control unit 50 also includes a second control subunit 54 that generates command signals for a motion of the fume hood 12 along a second path above the electric welding arc 64 based on signals received from the photoelectric sensors 40, 42 of the second pair. In the illustrated example, the second axis 62 is tangential to the second path. The motion of the fume hood 12 along the second path, however, can be considered to be substantially parallel to the second axis 62.

The control unit 50 further includes a third control subunit 56 that generates command signals for a motion of the fume hood 12 along a third path based on the signals received from the photoelectric sensors 36, 38 of the first pair and the photoelectric sensors 44, 46 of third pair. The motion along the third path substantially corresponds to a height distance variation between the fume hood 12 and the electric welding arc 64.

In the illustrated example, the photoelectric sensors 36 and 38 of the first pair provide side to side arc location feedback to the joint motor 28 through the first control subunit 52. The photoelectric sensors 40 and 42 of the second pair provide forward and rearward arc location feedback to the joint motor 24 through the second control subunit 54. Vertical tracking is achieved using the photoelectric sensor pairs 36/44 and 38/46.

Each joint motor 24, 28 and 30 operates independently of the other two. The salient features of this arrangement are twofold: simpler controls and the ability to track the arc 64 in both horizontal and vertical planes.

Figure 6:
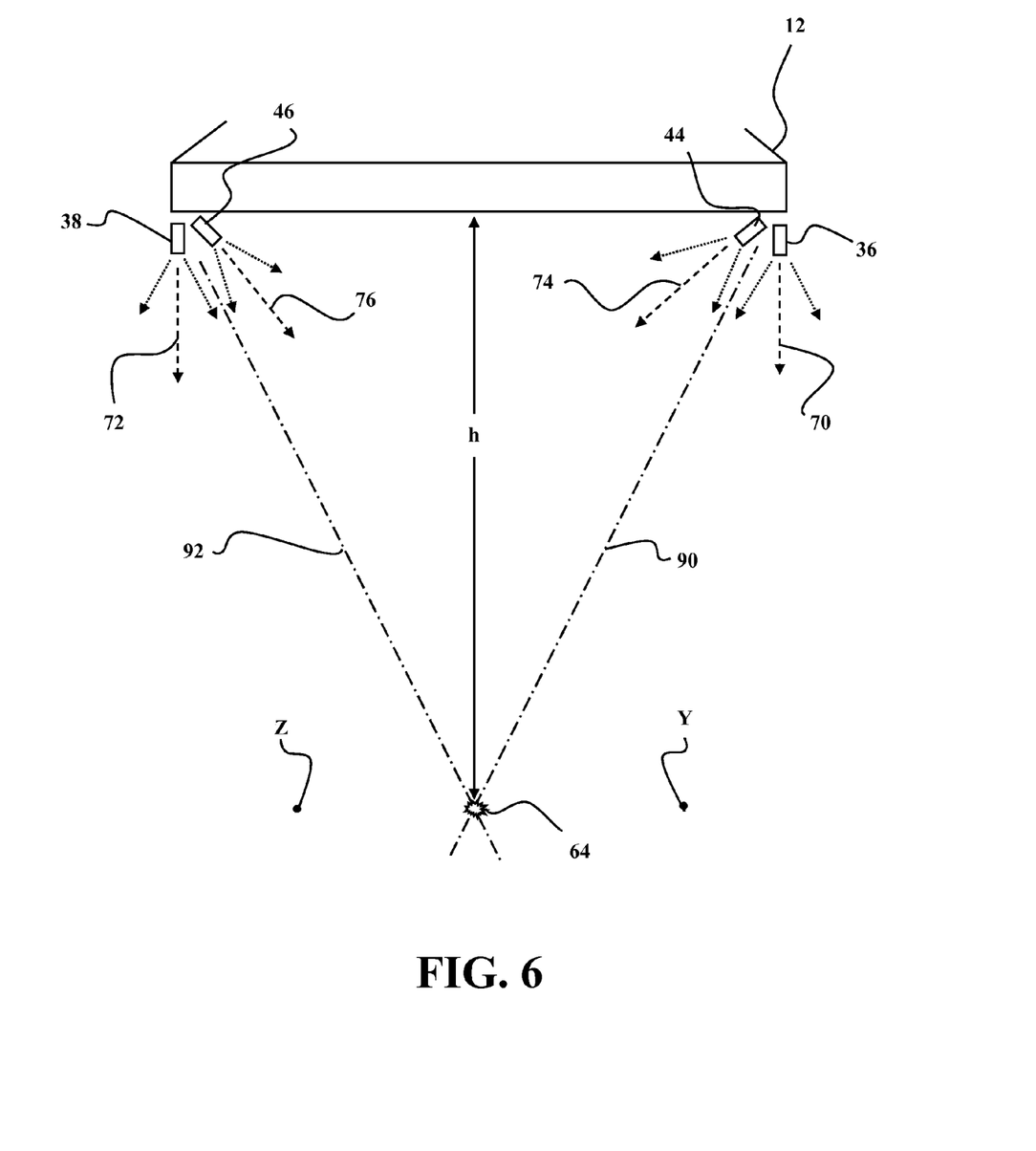
FIG. 6 is an example of a semi-schematic front view of the fume hood of the system shown in FIG. 1.

FIG. 6 is an example of a semi-schematic front view of the fume hood 12 of the system 10 shown in FIG. 1. It illustrates that the first and third pair of photoelectric sensors are each symmetrically disposed with reference to a medial plane, which medial plane extends vertically at the center of the fume hood 12 in FIG. 6. The photoelectric sensors 36, 38 of the first pair define an angle with reference to the medial plane that differs from an angle that the photoelectric sensors 44, 46 of the third pair define with the medial plane. Thus, the adjacent photoelectric sensors 36, 44 as well as the adjacent photoelectric sensors 38, 46 define a relative angle between them.

The photoelectric sensor 44 is located adjacent to the photoelectric sensor 36 to provide arc location information along their common sides between which extends axis 90. Similarly, the photoelectric sensor 46 is located adjacent to the photoelectric sensor 38 to provide arc location information along their common sides between which extends axis 92. These converging axes 90, 92 provide vertical arc location feedback to joint motor 30 through the third control subunit 56.

The photoelectric sensors 36, 38, 40, 42, 44 and 46 can be mounted in a tube or the like so as to gather light from a specific direction. Light comes from a cone-like area, as depicted in FIG. 6. The central axes of the cone-like area of the photoelectric sensors 36, 38, 44 and 46 are depicted at 70, 72, 74 and 76, respectively.

Figure 7:
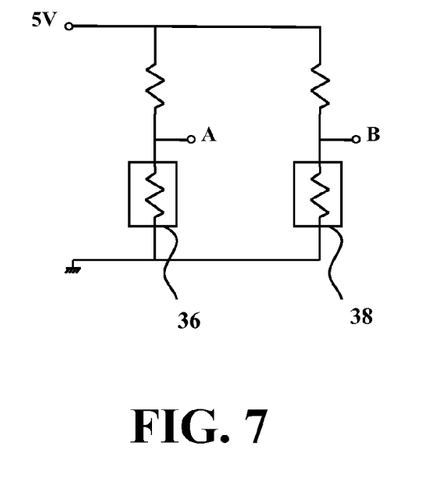
FIG. 7 is an example of an electrical diagram for the photoelectric sensors of the first pair of the system shown in FIG. 1.

FIG. 7 is an example of an electrical diagram for the photoelectric sensors 36, 38 of the first pair of the system 10 shown in FIG. 1. The signals of the photoelectric sensor 36 are read at terminal A and the signals of the photoelectric sensor 38 are read at terminal B. In the illustrated example, the signals are obtained by reading the voltage at terminals A and B.

Figure 8:
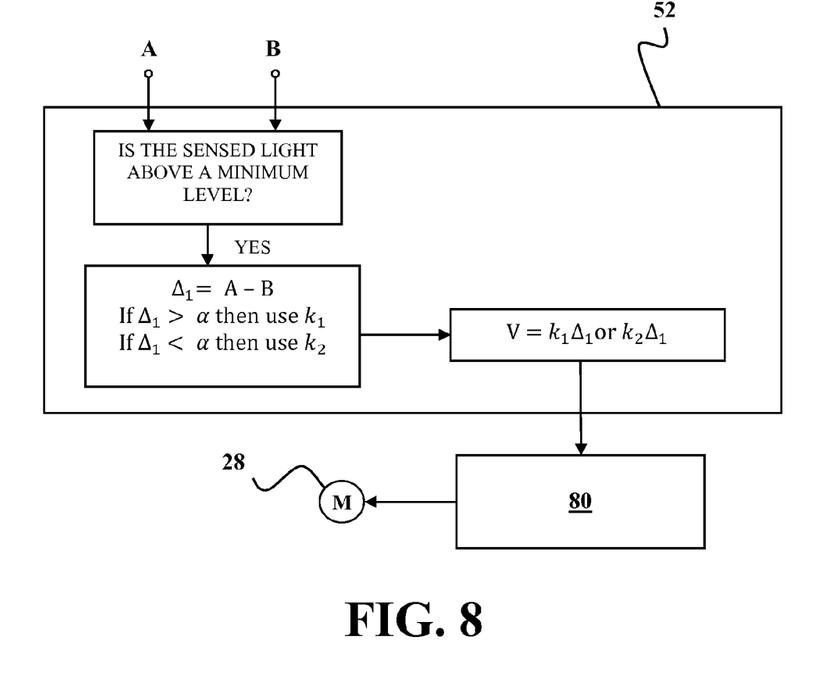
FIG. 8 is a block diagram depicting an example of how command signals are generated in the first control subunit of the system shown in FIG. 1.

FIG. 8 is a block diagram depicting an example an example of how command signals are generated in the first control subunit 52 of the system 10 shown in FIG. 1. The signals from terminals A and B are first checked to see if one of the photoelectric sensors 36, 38 senses light above a minimum level. For instance, in the illustrated example, the minimum light level can be set as a voltage such as 4.5 V. By contrast, since the resistance of a photoelectric sensor generally decreases as it receives more light, a very bright light may yield a voltage such as 0.5 V.

If the light level is above the minimum, the first control subunit 52 will compare the signal from A and B by subtracting them. This will give a value $\Delta_1$. If $\Delta_1 \neq 0$, this means that the two photoelectric sensors 36, 38 are not receiving the same amount of light from the arc 64. The system 10 assumes that the arc 64 is closer to the one receiving more light and the fume hood 12 will be moved towards the side receiving more light. The value of $\Delta_1$ can be positive or negative, which will indicate the direction of the motion to the joint motor 28.

The illustrated example further includes a selection between two possible motion speeds. The first control subunit 52 checks if the value of $\Delta_1$ is lower or higher than a predetermined value $\alpha$. A relatively high value of $\Delta_1$ indicates that arc 64 is relatively distant from one of the photoelectric sensors 36, 38. The motion speed will then be higher so as to position the fume hood 12 more quickly over the arc 64. The gain $k_1$ is higher than the gain $k_2$. Once the fume hood 12 is close to the position of the arc 64, the value of $\Delta_1$ will be lower. The motion speed will be reduced by using a lower gain $k_2$. Also, in the illustrated example, the command signals go through an amplifier 80 from which electrical power is supplied to the joint motor 28.

Figure 9:
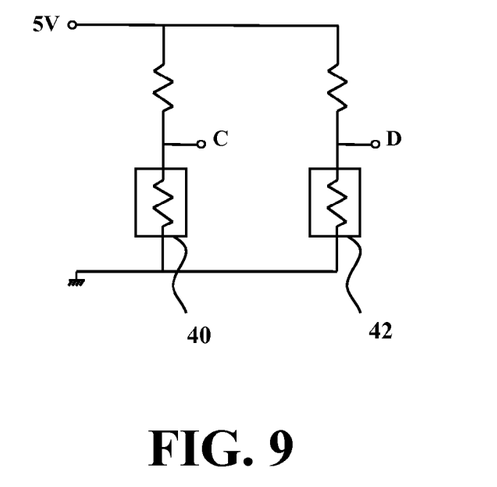
FIG. 9 is an example of an electrical diagram for the photoelectric sensors of the second pair of the system shown in FIG. 1.

FIG. 9 is an example of an electrical diagram for the photoelectric sensors 40, 42 of the second pair of the system 10 shown in FIG. 1. The signals of the photoelectric sensor 40 are read at terminal C and the signals of the photoelectric sensor 42 are read at terminal D. In the illustrated example, the signals are obtained by reading the voltage at terminals C and D.

Figure 10:
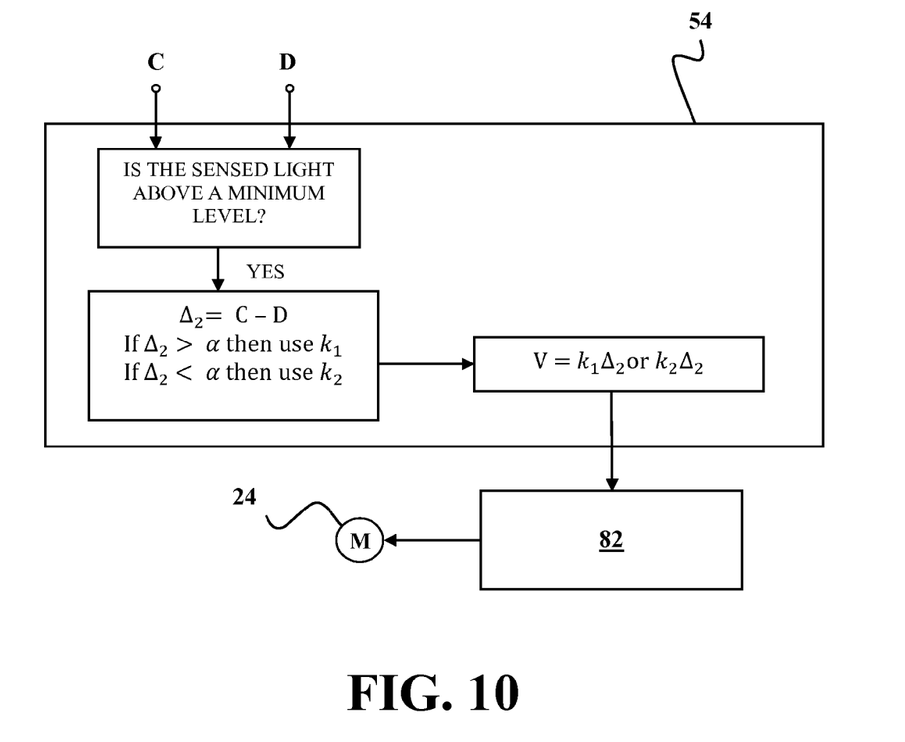
FIG. 10 is a block diagram depicting an example of how command signals are generated in the second control subunit of the system shown in FIG. 1.

FIG. 10 is a block diagram depicting an example an example of how command signals are generated in the second control subunit 54 in the system 10 shown in FIG. 1. The signals from terminals C and D are first checked to see if one of them sense light above a minimum level, for instance using the same manner as for the first control subunit 52.

If the light level is above the minimum, the second control subunit 54 will compare the signal from C and D by subtracting them. This will give a value $\Delta_2$. If $\Delta_2 \neq 0$, this means that the two photoelectric sensors 40, 42 are not receiving the same amount of light from the arc 64. The system 10 assumes that the arc 64 is then closer to the one receiving more light, thus that the fume hood 12 needs to be moved towards the side receiving more light. The value of $\Delta_2$ can be positive or negative, which will indicate the direction of the motion to the joint motor 24.

The illustrated example further includes a selection between two possible motion speeds. The second control subunit 54 checks if the value of $\Delta_2$ is lower or higher than a predetermined value $\alpha$. A relatively high value of $\Delta_2$ indicates that arc 64 is relatively distant from one of the photoelectric sensors 40, 42. The motion speed will then be higher so as to position the fume hood 12 more quickly. The gain $k_1$ is higher than the gain $k_2$. Once the fume hood 12 is close to the right position, the value of $\Delta_2$ will be lower. The motion speed will be reduced to the gain $k_2$ for the fine adjustments. It should be noted than one may choose a different value for a in the first control subunit 52 and in the second control subunit 54. The gains $k_1$ and $k_2$ can also be different in the two control subunits 52, 54. Also, in the illustrated example, the command signals go through an amplifier 82 from which electrical power is supplied to the joint motor 24.

Figure 11:
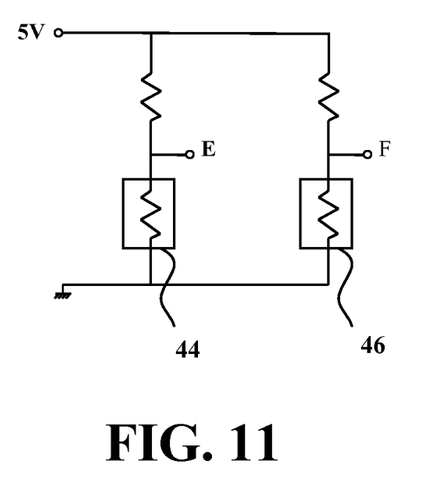
FIG. 11 is an example of an electrical diagram for the photoelectric sensors of the third pair of the system shown in FIG. 1.

FIG. 11 is an example of an electrical diagram for the photoelectric sensors 44, 46 of the third pair of the system 10 shown in FIG. 1. The signals of the photoelectric sensor 44 are read at terminal E and the signals of the photoelectric sensor 46 are read at terminal F. In the illustrated example, the signals are obtained by reading the voltage at terminals E and F.

Figure 12:
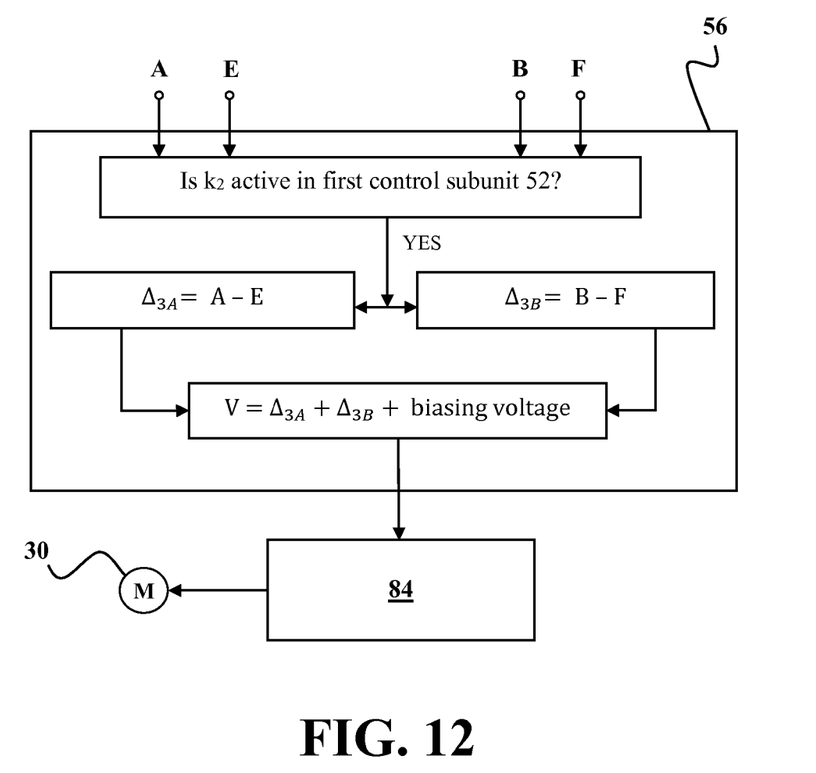
FIG. 12 is a block diagram depicting an example of how command signals are generated in the third control subunit of the system shown in FIG. 1.

FIG. 12 is a block diagram depicting an example an example of how command signals are generated in the third control subunit 56 of the system 10 shown in FIG. 1. In the illustrated example, the third control subunit 56 first checks if the first control subunit 52 has a $k_2$ gain. This is indicative of the presence of the arc 64 and that the fume hood 12 is also at or close to the desired position above the arc 64. The third control subunit 56 does not generate command signals if no arc is detected or if the fume hood 12 is being moved at the high motion speed. Other configurations and arrangements are also possible.

The third control subunit 56 will compare the signal from A and E by subtracting them and will compare the signal from B and F by subtracting them. The first comparison yields a first value $\Delta_{3A}$ and the second comparison yields a second value $\Delta_{3B}$. The first and second values are then added together. The result is a value indicative of the need to change the height distance h between the fume hood 12 and the arc 64. Also, in the illustrated example, the command signals go through an amplifier 84 from which electrical power is supplied to the joint motor 30.

It should be noted that the various operations of the control subunits 52, 54 and 56 can be done through software and/or hardware components. For instance, the comparators and the adder can be included in a dedicated control circuit or programmed in a computer.

Referring back to FIG. 6, the goal of the system 10 is to center the arc 64 under the fume hood 12 and keep the height distance h constant. This height distance h substantially corresponds to the point where axes 90, 92 meet, plus or minus any possible adjustments in height. This arrangement is able to compensate for a variation in the light intensity received at the photoelectric sensors 36, 38, 44 and 46 simply because the arc 64 is off centered.

For example, in FIG. 6, point Y and point Z are both at the same height distance h than the electric welding arc 64 depicted at the center. If the arc 64 would initially appear at point Y, the intensity of the light sensed by the photoelectric sensors 36, 44 will be greater than that sensed by the photoelectric sensors 38, 46. However, the difference between the light sensed by the photoelectric sensors 36, 44 on one side is proportional to the difference between the light sensed by the photoelectric sensors 38, 46 on the other side. Since point Y is at the correct height, no command signals will be generated to the joint motor 30 for changing the height distance h of the fume hood 12. A similar explanation also applies to point Z.

The height distance h between the hood 12 and the arc 64 can be adjusted by the operator via an adjustment knob on the fume hood 12 or elsewhere on the system 10. Turning the knob varies a biasing voltage. This biasing voltage is added to the sum of $\Delta_{3A}$ and $\Delta_{3B}$, as shown in FIG. 12.

In use, the magnitude of the signals from the photoelectric sensors 36, 38, 40, 42, 44 and 46 to the control unit 50 is directly proportional to the magnitude of the arc displacement. When operator strikes an arc, for instance using a welding gun as schematically illustrated in FIG. 1 at 34, at least one of the photoelectric sensors 36, 38, 40 and 42 of the first two pairs will sense the electric welding arc 64 if needed. This initiates the tracking operation. The fume hood 12 is then quickly centered over the arc 64. At this point all of the photoelectric sensors 36, 38, 40, 42, 44 and 46 are feeding arc location information to the control unit 50. The photoelectric sensors 36, 38, 40, 42, 44 and 46, operating in pairs, detect the change in position of the arc 64. The magnitude of the signal sent by each of the photoelectric sensors 36, 38, 40, 42, 44 and 46 to the control unit 50 is directly proportional to the light intensity from the arc 64 received at each photoelectric sensor 36, 38, 40, 42, 44 and 46. The control unit 50 analyzes the change in position by comparing the output signals of the photoelectric sensors. The control unit 50 then sends commands to the joint motors 24, 28, and 30 so as to reposition the fume hood 12 over the arc 64 in a direction that will bring the sensors output at the same level. This way, the fume hood 12 can be kept centered and at a predetermined height distance h from the arc 64. Since only the difference in intensity (as seen by the respective photoelectric sensors) is used to control the positioning of the fume hood 12, the arc intensity or even the nature of the arc is transparent to the system 10.

Each of the joint motors 24, 28, and 30 may be fitted with an internal slip clutch. Each slip clutch is designed to allow the corresponding joint motor 24, 28, and 30 to rotate even if the corresponding joint connection cannot be pivoted. This way, if the fume hood 12 or any other part of the articulated exhaust duct robotic arm 14 encounters an obstacle, the slip clutches can preclude further movements of the arm 14 and/or the joint motors 24, 28 and 30 to be damaged. The slip clutches can also allow the operator to position the fume hood 12 manually before operating the work tool without damaging the joint motors 24, 28, and 30. Nevertheless, a stop button 48 (FIG. 1) can be mounted on the fume hood 12 to stop the operation of the system 10 and/or the operation of the joint motors 24, 28, and 30, if required.

The present concept further provides a method of automatically positioning a fume hood 12 above an electric welding arc 64 during a welding operation on a workpiece 34, the fume hood 12 being mounted at the free end of a robotic arm 14. The method includes:

sensing the light level received from the arc 64 at a first and a second location under the fume hood 12, the first and the second location being spaced apart along a first axis 60;

sensing the light level received from the arc at a third and a fourth location under the fume hood 12, the third and the fourth location being spaced apart along a second axis 62 that is orthogonal to the first axis 60;

sensing the light level received from the arc at a fifth and a sixth location under the fume hood 12, the fifth location being adjacent to the first location and the sixth location being adjacent to the second location; and generating command signals for the robotic arm 14 based on the light levels sensed at the six locations such that the fume hood 12 is moved to a given height distance h right above the arc 64 and automatically follows the arc 64 when the arc 64 moves over the workpiece 34.

Generating command signals for the robotic arm 14 may include generating a first set of command signals based on a difference between the light levels sensed at the first and the second location, the first set of command signals controlling movements of the fume hood 12 along a first path above the arc 64 so as to center the arc 64 in-between the first and the second location. It may also include generating a second set of command signals based on a difference between the light levels sensed at the third and the fourth location, the second set of command signals controlling movements of the fume hood 12 along a second path above the arc 64 so as to center the arc 64 in-between the third and the fourth location.

Still, generating command signals for the robotic arm 14 may include:

(a) comparing the light levels sensed at the first and the fifth location;

(b) comparing the light levels sensed at the second and the sixth location;

(c) generating a third set of command signals based on the results in (a) and (b), the third set of command signals controlling movements of the fume hood 12 so as to set the height distance h between the fume hood 12 and the arc 64. The third set of command signals can be based on an addition of the results in (a) and (b).

Sensing the light level received from the arc at the fifth and the sixth location under the fume hood 12 may include sensing light at the fifth location along an axis 74 defining a first relative angle with reference to an axis 70 along which the light is sensed at the first location; and sensing light at the sixth location along an axis 76 defining a second relative angle with reference to an axis 72 along which the light is sensed at the second location. The first and the second relative angle can be substantially equal.

As can be appreciated, a fume extraction system incorporating the proposed concept, as well as a method of extracting fumes from a work area using the proposed concept, will not be affected by the relative orientation of the work tool or the nature of the welding process and can provide a more dependable operation than ever before without the need of a complex construction. Using this arrangement also considerably reduces the likelihood of faults due for instance to the presence of dense fumes to be exhausted from around the workpiece.

The present detailed description and the appended figures are meant to be exemplary only, and a skilled person will recognize that variants can be made in light of a review of the present disclosure without departing from the proposed concept. For instance, the articulated exhaust duct robotic arm can be constructed differently than what is shown and described. The arm may be constructed with one or more flexible tubes supported by rigid beam-like arm segments to which the motorized joints are mounted. Many other constructions are also possible.

If desired, the photoelectric sensors 44, 46 can be located adjacent to the photoelectric sensors 40, 42 instead of the photoelectric sensors 36, 38. Thus, in that context, the photoelectric sensors 40, 42 would constitute the first pair of photoelectric sensors and the photoelectric sensors 36, 38 would constitute the second pair of photoelectric sensors.

The third axis along which the third pair of photoelectric sensors is disposed does not necessarily need to be coincident with the first axis along which the first pair of photoelectric sensors is disposed.

The photoelectric sensors do not necessarily need to be cadmium sulfide cells. Other suitable kinds of photoelectric sensors could be used as well, for instance photodiodes.

The base does not need to be a mobile device as shown and described. Other configurations and arrangements are possible. For instance, the base can be a fixed device or even be a structure, such as a wall, a floor or a ceiling.

The references to the words such as "horizontal", "vertical" and "height" do not mean that the system and method are limited to work on a horizontal surface.

The invention claimed is:

1. A fume extraction system capable of automatically following an electric welding arc, the system including:

a base;

an articulated exhaust duct robotic arm including a proximal segment and a distal segment, the distal segment being juxtaposed to the proximal segment using a first motorized joint having a first joint motor, the proximal segment being mounted to the base using a second and a third motorized joint having a second and a third joint motor, respectively, the second joint motor changing a yaw angle of the proximal segment with reference to the base and the third joint motor changing a pitch angle of the proximal segment with reference to the base;

a fume hood mounted to the distal segment of the articulated exhaust duct robotic arm;

a first pair of photoelectric sensors provided on the fume hood to sense the presence of the electric welding arc, the photoelectric sensors of the first pair being spaced apart from one another along a first axis;

a second pair of photoelectric sensors provided on the fume hood to sense the presence of the electric welding arc, the photoelectric sensors of the second pair being spaced apart from one another along a second axis;

a third pair of photoelectric sensors provided on the fume hood to sense the presence of the electric welding arc, the photoelectric sensors of the third pair being adjacent to a corresponding one of the photoelectric sensors of the first pair and the photoelectric sensors of the third pair being spaced apart from one another along a third axis, and each of the photoelectric sensors of the third pair having a corresponding light-sensing central axis that defines a relative angle with reference to a light-sensing central axis of an adjacent one of the photoelectric sensors of the first pair, the photoelectric sensors of the first pair being symmetrically disposed with reference to a medial plane projecting under a center of the fume hood and the photoelectric sensors of the third pair being symmetrically disposed with reference to the medial plane; and a control unit that generates command signals for the articulated exhaust duct robotic arm so as to automatically position the fume hood over the electric welding arc and maintain a predetermined height distance between the fume hood and the electric welding arc, the command signals being based on signals received from the three pairs of photoelectric sensors, the control unit including:
- a first control subunit connected to the photoelectric sensors of the first pair, the first control subunit generating command signals for a motion of the fume hood along a first path based on the signals received from the photoelectric sensors of the first pair;
- a second control subunit connected to the photoelectric sensors of the second pair, the second control subunit generating command signals for a motion of the fume hood along a second path based on the signals received from the photoelectric sensors of the second pair; and
- a third control subunit connected to the photoelectric sensors of the first pair and of the third pair, the third control subunit generating command signals for the third joint motor to create a motion of the fume hood along a third path based on the signals received from the photoelectric sensors of the first pair and also from the photoelectric sensors of the third pair, the motion along the third path corresponding to a height distance variation between the fume hood and the electric welding arc.

2. The system as defined in claim 1, wherein the first axis and the second axis are orthogonal.

3. The system as defined in claim 2, wherein one among the first and second axes is parallel to the first path of the fume hood and the other one among the first and second axes is parallel to the second path of the fume hood.

4. The system as defined in claim 1, wherein the first and the third axis are parallel to one another.

5. The system as defined in claim 1, wherein the third control subunit includes:
- a first comparator to calculate a first value indicative of a difference between the signals from one of the photoelectric sensors of the first pair and the adjacent one of the photoelectric sensors of the third pair;
- a second comparator to calculate a second value indicative of a difference between the signals from the other one of the photoelectric sensors of the first pair and the adjacent one of the photoelectric sensors of the third pair; and
- an adder to calculate a third value involving an addition of the first and the second values, the command signals of the third control subunit being based on the third value.

6. The system as defined in claim 1, wherein at least one of the motorized joints includes a slip clutch.

7. The system as defined in claim 1, wherein the photoelectric sensors are provided adjacent to the periphery of the fume hood.

8. The system as defined in claim 7, wherein the photoelectric sensors include cadmium sulfide cells.

* * * * *